US 12,489,730 B1

United States Patent
Tang et al.

(10) Patent No.: US 12,489,730 B1
(45) Date of Patent: Dec. 2, 2025

(54) PROCESSING FOR SPAM DETECTION OF UNTRUSTED DOMAINS

(71) Applicant: Microsoft Technology Licensing, LLC, Redmond, WA (US)

(72) Inventors: Lu Tang, Issaquah, WA (US); Shi Pu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/785,760

(22) Filed: Jul. 26, 2024

(51) Int. Cl.
*H04L 9/40* (2022.01)
*G06F 16/951* (2019.01)

(52) U.S. Cl.
CPC ........ *H04L 63/0236* (2013.01); *G06F 16/951* (2019.01)

(58) Field of Classification Search
CPC .................................................. H04L 63/0236
USPC ......................................................... 707/785
See application file for complete search history.

(56) References Cited

U.S. PATENT DOCUMENTS

2024/0039890 A1\* 2/2024 Szurdi ................ H04L 63/0236

FOREIGN PATENT DOCUMENTS

| CN | 112333185 A | * | 2/2021 | .......... H04L 61/1511 |
| KR | 102535118 B1 | * | 5/2023 | ........... G06Q 10/083 |
| WO | WO-2007136665 A2 | * | 11/2007 | ............. H04L 63/10 |

\* cited by examiner

*Primary Examiner* — Syling Yen
(74) *Attorney, Agent, or Firm* — Shook, Hardy & Bacon L.L.P.

(57) ABSTRACT

Embodiments of the technology described programmatically decrease the number of spam Uniform Resource locators (URLs) that are accessed from untrusted domains when the subdomain prefix is above a threshold probability of having been randomly generated. In this regard, prior to adding a discovered set of URLs to a crawl queue of a web crawler, the URLs are filtered into URLs from trusted domains and untrusted domains determined by a statistical model. The trusted domain URLs are added to the crawl queue, and the remaining URLs are sandboxed to filter out spam URLs. The subdomain prefixes of the sandboxed URLs are applied to a neural network to determine the probability that the subdomain prefixes are randomly generated. When a subdomain prefix is above a threshold probability of having been randomly generated, the subdomain is determined to be a spam subdomain and can be blocked.

20 Claims, 6 Drawing Sheets

PROCESSING FOR SPAM DETECTION OF UNTRUSTED DOMAINS

BACKGROUND

A URL (Uniform Resource Locator) is the web address used to access resources on the internet. Generally, a URL includes several components: the protocol (e.g., "https"), the domain name (e.g., "domain.com"), a subdomain prefix ("subdomain.domain.com") that identifies a subdomain of a domain (also referred to herein as a "host prefix"), and the path specifying the resource location on the service. The subdomain prefix allows for better organization and management of different functions or services under the same domain.

A spam burst attack is a malicious activity where an attacker generates a large number of spam URLs on a domain within a short period of time. Typically, during a spam burst attack, a large number of spam subdomains are generated on a compromised domain and spam URLs are then generated on each spam subdomain. The spam URLs include low-quality or irrelevant content that is designed to harm the host domain, manipulate search engine rankings, deceive users, or distribute malware. Not only can the sudden influx of spam URLs overwhelm the host domain's resources and degrade the host domain's performance, the sudden influx of spam URLs can harm the reputation of the host domain, causing users to avoid navigating to pages hosted by the host domain.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments described herein programmatically decrease the number of spam URLs that are fetched and analyzed by blocking URLs associated with a subdomain of an untrusted domain when the subdomain prefix is above a threshold probability of having been randomly generated. In one embodiment, daily discovered sets of URLs corresponding to outlinks discovered during periodic crawl operations by a web crawler are applied to a statistical model. The statistical model determines whether a domain should be added to a trusted domain whitelist or a compromised domain blacklist based on the number of discovered URLs of the domain in the daily discovered URLs, the number of subdomains of the domain in the daily discovered URLs, and user behavior data for the domain.

Prior to adding a periodically discovered set of URLs corresponding to outlinks discovered during the daily crawl operations to a crawl queue for downstream processing by the web crawler to fetch content at each URL, the daily discovered set of URLs are filtered into URLs from trusted domains of the trusted domain whitelist and the remaining URLs from untrusted domains, including compromised domains of the compromised domain blacklist and untrusted domains that are not on the trusted domain whitelist or compromised domain blacklist. The URLs from trusted domains are added to the crawl queue of the web crawler for crawling and indexing with minimal latency. The URLs from untrusted domains are placed in a sandbox environment to isolate and filter out spam URLs before downstream processing by the web crawler with minor additional latency. All of the URLs of the daily discovered set of URLs, including the URLs from trusted domains and the URLs from untrusted domains, are applied to the statistical model to periodically update the trusted domain whitelist and compromised domain blacklist for filtering of subsequent discovered sets of URLs.

In the sandbox environment, the subdomain prefix of each of the URLs from untrusted domains are applied to a neural network to determine the probability that the subdomain prefix is randomly generated. When a subdomain prefix is above a threshold probability of having been randomly generated, the subdomain is determined to be a spam subdomain, and the URLs associated with the spam subdomain can be blocked so that the content from the URL is not fetched and analyzed in downstream processes of the search engine. When a subdomain prefix is below a threshold probability of having been randomly generated, the subdomain is determined to be a non-spam subdomain, and the URLs from the non-spam subdomain are released from the sandbox environment and provided for downstream processing by the web crawler for crawling and indexing with minor additional latency to ensure the subdomain is less likely to be spam generated from a spam burst attack on a compromised domain.

In this regard, when the statistical model detects that a domain has been compromised, the subdomains that were not created by spammers can be isolated for downstream processing by the search engine, such as crawling and indexing builds. While historical user behavior can indicate non-spam subdomains within a compromised domain in some scenarios, only relying on historical user behavior may allow some spam subdomains to be processed, as spammers can fake user behavior for the spam subdomains. Therefore, in certain scenarios, all subdomains from domains with low overall user engagement can be applied to a neural network to determine the probability that the subdomain prefix is randomly generated to block the spam subdomain.

BRIEF DESCRIPTION OF THE DRAWINGS

The present disclosure is described in detail below with reference to the attached drawing figures, wherein.

DETAILED DESCRIPTION

Figure 1:
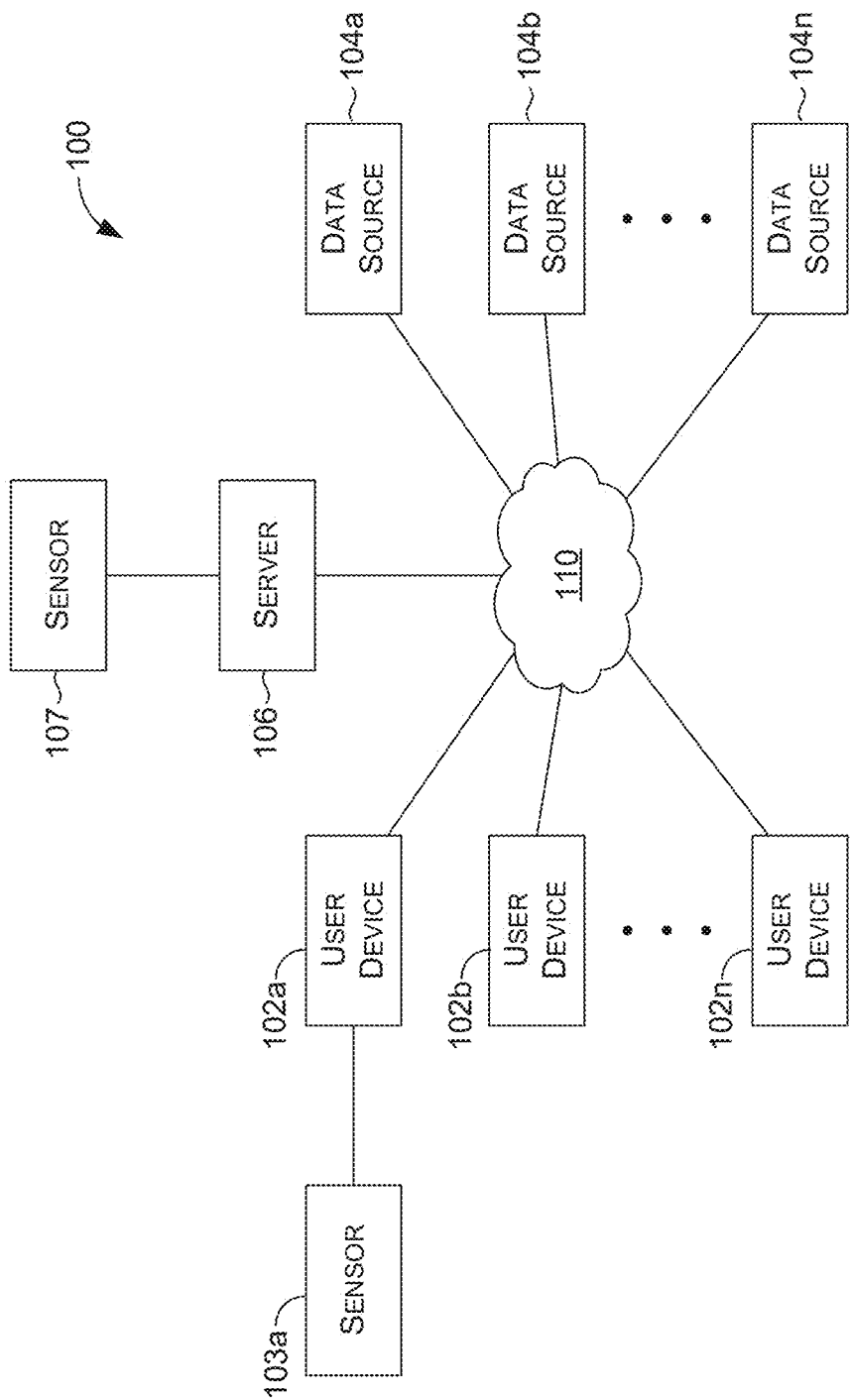
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Embodiments of the technologies provide herein programmatically decrease the number of spam URLs that are fetched and analyzed by blocking URLs associated with a subdomain of an untrusted domain when the subdomain prefix is above a threshold probability of having been randomly generated. Generally, search engines discover and index content through web crawling and indexing. Web crawlers systematically browse the internet by finding new or updated webpages and fetching the content to the search engine's servers for indexing. During indexing, the fetched content is analyzed to determine whether to index the webpage, referred to herein as index selection, and to extract relevant information such as keywords, metadata, and other contextual data, and stores the information in an index. The index allows the search engine to quickly retrieve and rank pages in response to user queries. In order to maintain accurate and up-to-date search results, the index is regularly updated by re-crawling and re-indexing webpages to reflect the latest content.

In this regard, a discovered set of URLs can be added to a crawl queue for use by the web crawler for crawling and indexing. For example, the URLs of the crawl queue can include previously crawled URLs and newly added URLs that have not been crawled. The previously crawled URLs and newly added URLs can be utilized as the discovery seeds, which are the initial set of URLs given to a web crawler, and serve as the starting point for the web crawler to fetch and analyze web pages for indexing. As the web crawler visits the web pages, the web crawler extracts outlinks, which are URLs to other web pages, and the outlinks can be added to the crawl queue to be crawled and indexed. As another example, domain and/or website owners can add URLs to the crawl queue for crawling and index by submitting their sitemaps directly to search engines for crawling and indexing and/or through really simple syndication (RSS) feeds that alert search engines to new content.

In certain instances, such as a spam burst attack, the attack will often cause spam URLs generated on each spam subdomain to be included in the crawl queue for the web crawler. Some prior techniques determine whether to remove the spam URL and the associated content of the spam URL from indexing by having the web crawler fetch the contents of the spam URLs to analyze the content of the spam URL and determine whether the spam URL is indeed spam. In some prior techniques, the content of spam URLs can be manually reviewed by engineers to determine whether the spam URL is indeed spam. Some prior techniques apply the content of spam URLs to machine learning algorithms trained on features extracted from the content of known spam and non-spam URLs to determine whether the content of the spam URL is indeed spam. The machine learning algorithm may determine that the content of the web page is indeed spam based on aspects, such as an excessive use of keywords for keyword stuffing, hidden text, irrelevant or misleading content, outbound links to low-quality or irrelevant sites, the number and nature of outbound links, suspiciously high numbers of ads, the use of certain types of redirects, and/or others. After the content is analyzed to determine that the spam URL is indeed spam, the spam URL can then be removed from indexing and blocked from future crawling and indexing.

Computing and network resources utilization increases when the content of each spam URL is fetched and stored during web crawling. For example, fetching and storing the content of each spam URL for analysis increases processing requirements due to increased input/output operations and increases network bandwidth utilization when the data is transmitted over a network. Further, as the content of the spam URL is analyzed in prior implementations, oftentimes by computationally expensive machine learning algorithms and manual human review, additional computing and network resources must be utilized in order to analyze the content of the spam to determine whether the spam URL is indeed spam. In this regard, not only can the sudden influx of spam URLs overwhelm the host domain's resources and degrade the host domain's performance during a spam burst attack, the spam burst attack can overwhelm a search engine's resources and degrade a search engine's performance when the search engine must provision computing and networking resources to fetch, store, and analyze the content of the spam URLs. Fetching, storing, and analyzing content from spam URLs can slow down data processing, cause memory outflow, reduce the accuracy of spam detection models, and damage the user experience when spam URLs are presented in search results.

To address these and other technical issues, certain embodiments disclosed herein include a statistical model to determine whether a domain is trusted based on a change in the number of URLs and/or number of subdomains of the domain and user behavior data. In this regard, when the domain is trusted, the URLs of the trusted domain can be provided to the web crawler to fetch and analyze the content of the URL, as the URL of the trusted domain will have lower likelihood of being spam, thereby decreasing the number of spam URLs that are fetched and analyzed by prior techniques. Certain embodiments disclosed herein include applying a subdomain prefix of an untrusted domain to a convolutional neural network (CNN) to determine the probability that the subdomain prefix is randomly generated. In this regard, when a subdomain prefix is above a threshold probability of having been randomly generated and the domain is untrusted, the URLs associated with the subdomain can be blocked from being fetched and analyzed, thereby decreasing the number of spam URLs that are fetched and analyzed by prior techniques.

In certain embodiments, periodically (for example, daily) discovered sets of URLs-corresponding to outlinks discovered during periodic (for example, daily) crawl operations by a web crawler, but not yet crawled by the web crawler so accessibility and content of the URLs are unknown—are applied to a statistical model to determine a trusted domain whitelist and a compromised domain blacklist. For example, a web crawler can perform daily crawling operations where the web crawler extracts outlinks from URLs of a daily crawl queue. Prior to crawling the extracted outlinks, the extracted outlinks, or URLs corresponding to the extracted outlinks, such as seeds extracted from the outlinks, can be filtered using the trusted domain whitelist and the compromised domain blacklist before being added to subsequent daily crawl queues for the crawl operations on subsequent days.

In certain embodiments, the statistical model determines whether a domain should be added to a trusted domain whitelist or a compromised domain blacklist periodically. In certain examples, this is based on the number of discovered URLs of the domain in the periodically discovered set of URLs, the number of subdomains of the domain in the periodically discovered set of URLs, and user behavior data for the domain. In certain examples, the statistical model determines whether a domain should be added to a trusted domain whitelist or a compromised domain blacklist periodically over a lookback time period, such as daily, weekly, monthly, and/or the like, using the periodically discovered set of URLs over the corresponding lookback time period. For example, all of the daily discovered URLs over the course of the month can be applied to the statistical model to determine whether a domain should be added to a trusted domain whitelist or a compromised domain blacklist.

In certain examples, the compromised domain blacklist includes compromised domains where a number of subdomains of the domain in the periodically discovered set of URLs over a lookback time period is above a threshold number of subdomains. In certain examples, the compromised domain blacklist includes compromised domains where a number of URLs of the domain in the periodically discovered set of URLs over a lookback time period is above a threshold number of URLs. In certain examples, the compromised domain blacklist includes compromised domains where the user behavior data for the entire domain is below a threshold level over all of the URLs of the domain for a specific time period. In certain examples, the user behavior data can be determined based on a ratio of a number of clicks by users of a search engine through a search engine result page, and corresponding dwell time once users click into the result page, across all the URLs of the domain over the specific time period. In certain examples, the specific time period can be longer than the lookback time period, such as a year or longer. In certain examples, the user behavior data can be determined based on a ratio of a number of clicks by users of a search engine through a search engine result page where the user remains navigating on the URL over a threshold period of time (for example, to ignore accidental clicks) across all of the URLs of the domain over the specific time period.

In certain examples, the compromised domain blacklist includes compromised domains based on any combination of determinations based on the periodically discovered set of URLs over a lookback time period implemented by the statistical model, such as (1) (a) the number of subdomains of the domain in the URLs is above a threshold number of subdomains or (b) the number of URLs of the domain is above a threshold number of URLs; and (2) the user behavior data for the entire domain is below a threshold level over all of the URLs of the domain for a specific time period.

In certain examples, the trusted domain whitelist includes a threshold number of trusted domains where the user behavior data for the entire domain is above a threshold level over all of the URLs of the domain for a specific time period. In certain examples, a threshold number of trusted domains, such as 100,000 domains, can be added to the trusted domain whitelist where the domains include above a threshold number of URLs with user behavior data above a threshold number, such as a larger number of clicks where the user remains navigating on the URL over a threshold period of time than the threshold number of clicks used to determine the blacklist domains. In certain examples, once a domain is added to the trusted domain whitelist, it could still be removed from the domain whitelist in the future if the domain is detected as a compromised domain based on the periodically discovered set of URLs over a lookback time period implemented by the statistical model, such as (a) the number of subdomains of the domain in the URLs is above the threshold number of subdomains or (b) the number of the URLs of the domain is above a threshold number of URLs.

In certain examples, the remaining domains where the statistical model does not determine that the corresponding domain should be added to a trusted domain whitelist or to a compromised domain blacklist are determined to be untrusted domains.

Any known technique can be used to determine whether a domain should be a trusted domain or an untrusted domain, such as a compromised domain, such as by using any known anomaly detection technique. Generally, user behavior data refers to data regarding interactions of users with respect to webpages, such as through search results. User behavior data can include click data indicating the number of times users select a URL from search results, navigation data indicating the number of times users select a URL and the time the users spend navigating on the URL, impressions indicating the number of times a URL is displayed to a user through search results, and/or other interaction data with URLs, such as user data provided by a host domain, owner, and/or third party service for a URL. Any known technique can be used to determine the user behavior data for the URLs of the domains.

A specific example of pseudocode indicating conditions as to whether to add or remove a domain from the compromised domain blacklist is provided as follows:

Add Domain to Blacklist:
    WHERE (# of outlinks per domain>1M OR # of hosts per domain>1 k)
    AND NOT (# of Good user behavior data/# of outlinks per domain>0.01%)

Lift from Blacklist:
    WHERE (# of hosts per domain<=(# of hosts per domain baseline*2+1 k))
    AND (# of Good user behavior/# of outlinks per domain>=1%)

As can be understood, the statistical model adds a domain to the compromised domain blacklist if (1) the number of outlinks of the discovered set of URLs is above a threshold (for example, one million outlinks) or the number of subdomains of the domain of the discovered set of URLs is above a threshold (for example, one thousand subdomains) and (2) user behavior data is below a threshold value, such as when the ratio of the number of clicks where the users remain navigating on the URL above a threshold period of time for all of the URLs of the domain is below 0.01%.

Further, as can be understood from the specific example, the statistical model removes a domain from the compromised domain blacklist if (1) the number of subdomains of the domain in the crawl queue decreases significantly below a baseline, such as a number of non-spam subdomains over the entire domain, and (2) user behavior data is above a threshold value, such as when the ratio of the number of clicks where the users remain navigating on the URL above a threshold period of time for all of the URLs of the domain is above 1%. As can be understood, the threshold values for determining whether to add a domain to the blacklist can be different than the threshold values for determining whether to remove a domain from the blacklist. In this regard, in certain examples, when the webmaster removes the spam subdomains from a compromised domain, the compromised domain can be removed from the compromised domain blacklist.

In certain embodiments, subsequent periodically discovered sets of URLs corresponding to outlinks discovered during periodic crawl operations by a web crawler and/or subsequent user behavior data can be applied to the statistical model to periodically update the blacklist set of compromised domains and/or the whitelist set of trusted domains. For example, the blacklist set of compromised domains and/or the whitelist set of trusted domains can be refreshed periodically, such as daily, weekly, monthly, and/or the like, by the statistical model after the URLs of the daily discovered sets of URLs for the corresponding day are filtered.

In certain embodiments, prior to adding a periodically (for example, daily) discovered set of URLs corresponding to outlinks discovered during previous crawl operations to a crawl queue for downstream processing by the web crawler to fetch content at each URL, the discovered set of URLs are filtered into URLs from trusted domains of the trusted domain whitelist and untrusted domains. For example, the trusted domain whitelist and the compromised domain blacklist are updated by the statistical model based on the previous discovered sets of outlinks. The current daily discovered set of outlinks is then filtered into URLs from domains of the trusted domain whitelist and untrusted domains. The current daily discovered set of outlinks is then used by the statistical model to update the trusted domain whitelist and the compromised domain blacklist.

In certain embodiments, the URLs of the discovered set of URLs from domains of the trusted domain whitelist are added to the crawl queue of the web crawler for crawling and indexing with minimal latency. For example, during downstream processing by the web crawler, the web crawler fetches the content of the URL and analyzes the content to determine whether the URL is spam using any known technique, such as through machine learning models that analyze the content trained to determine whether content is spam. The URLs of the discovered set of URLs from untrusted domains, such as domains of the compromised domain blacklist and/or untrusted domains not on the trusted domain whitelist, are placed in a sandbox environment to isolate and filter out spam URLs before downstream processing by the web crawler with minor additional latency. In certain examples, all of the URLs of the discovered set of URLs, including the URLs from trusted domains and the URLs from untrusted domains, are applied to the statistical model to update the trusted domain whitelist and compromised domain blacklist for filtering of subsequent discovered sets of URLs.

In the sandbox environment, the subdomain prefix of the subdomain of each URL from untrusted domains is used to filter the URLs from untrusted domains into URLs from spam subdomains and URLs from non-spam domains. The URLs from spam subdomains can be blocked so that the content from the URL is not fetched and analyzed in downstream processes. The URLs from the non-spam subdomains can be released from the sandbox environment and provided for downstream use by the web crawler.

In certain embodiments, the subdomain prefix of each of the URLs from untrusted domains are applied to a neural network to determine the probability that each subdomain prefix is randomly generated. In certain examples, when a subdomain prefix is above a threshold probability of having been randomly generated, the subdomain is determined to be a spam subdomain, and the URLs associated with the spam subdomain can be blocked so that the content from the URL is not fetched and analyzed in downstream processes of the search engine. Any known technique can be used to determine the probability that the subdomain prefix is randomly generated, such as a CNN.

In certain examples, when a subdomain prefix is below a threshold probability of having been randomly generated, the subdomain is determined to be a non-spam subdomain, and the URLs from the non-spam subdomain are released from the sandbox environment and provided for downstream processing by the web crawler for crawling and indexing. For example, during downstream processing by the web crawler, the web crawler fetches the content of the URL and analyzes the content to determine whether the URL is spam using any known technique. In this regard, the URLs from non-spam subdomains of untrusted domains (for example, domains of the compromised domain blacklist and/or untrusted domains not on the trusted domain whitelist) can proceed to downstream processing by the web crawler with minor additional latency (for example, the content can be processed the next day) that ensures that the subdomain is less likely to be spam generated from a spam burst attack on a compromised domain.

In certain embodiments, the threshold randomness as to whether a subdomain prefix is a spam subdomain can be manually set for all domains. In certain embodiments, the threshold randomness as to whether a subdomain prefix is a spam subdomain can be manually set where the threshold randomness is different for different domains.

In certain embodiments, the threshold probability as to whether a subdomain prefix is randomly generated can be determined based on user behavior data for the URL, subdomain, and/or domain. For instance, as a specific example, a spam subdomain with a high probability that the subdomain prefix is randomly generated and low user behavior data (for example, a few accidental clicks) can be determined to be spam and blocked without requiring the higher computational costs of the downstream processes. In some examples, after aggregating user behavior data per URL to the subdomain level, a subdomain with abundant user behavior can skip the subdomain prefix randomness prediction, as the subdomain can be determined to be a non-spam subdomain based on the user behavior data alone. In some examples, after aggregating user behavior per URL to the subdomain level, a subdomain with less sparse user behavior can have a higher threshold probability as to whether its subdomain prefix is randomly generated to determine whether a subdomain is spam versus a subdomain with more sparse user behavior.

In certain embodiments, a CNN can be trained to determine the probability that a subdomain prefix is randomly generated, such as by using a 4-gram pre-trained English tokenizer with a shallow CNN. In certain examples, in order to train the neural network, training cases are collected, such as training cases corresponding to spam subdomains with random subdomain prefixes (for example, without any user behavior) and non-spam subdomains with non-randomly generated subdomain prefixes. For example, the training cases can be manually curated from known spam and non-spam subdomains. A portion of the training cases are used as training data, and a portion of the training cases are used as evaluation data. In some examples, the training data is fed through a tokenizer and a CNN training module in order to train the CNN model with a sigmoid function to predict the probability that a subdomain prefix is randomly generated (for example, as a value in the range of 0.0:1.0). The evaluation data is applied to the trained model to determine evaluation metrics, such as precision and recall, of the trained model.

In certain embodiments, the blocked URLs and/or blocked spam subdomains (for example, so that the content from the URL is not fetched and analyzed in downstream processes by the web crawler) can be used in certain downstream processes of web crawling and indexing and/or determining subsequent crawl queues. In certain examples, the blocked URLs are dropped and not stored. In certain examples, the blocked URLs and/or spam subdomains can be used to determine which web pages to include in the index during index selection. For instance, webpages that include a threshold number of links to spam subdomains can be removed from the index. In certain examples, the blocked URLs and/or spam subdomains can be used to rank web pages. For instance, webpages that include links to spam subdomains can be ranked lower. In certain examples, the blocked URLs and/or spam subdomains can be used to block URLs from being included in a subsequent crawl queue, such as by blocking the URLS from being included as discovery seeds, blocking the web crawler from extracting the URLs as outlinks, blocking users from manually adding the blocked URLs for crawling by the web crawler, blocking indications of new content at the URL from RSS feeds, and/or others.

The present disclosure provides one or more technical solutions that have technical effects in light of various technical problems. Particular embodiments have the technical effect of decreasing computing and network resource utilization and improving computational efficiency in performing computationally expensive operations, such as those associated with fetching, storing, and analyzing content of spam URLs to determine whether the spam URL is indeed spam. For example, particular embodiments described herein decrease the number of spam URLs that are fetched, stored, and analyzed by determining whether a domain is trusted based on a change in the number of host domains and user behavior, determining the probability that a subdomain prefix of a subdomain of an untrusted domain is randomly generated, and blocking URLs associated with the subdomain from being fetched for analysis when the subdomain prefix is above a threshold probability of having been randomly generated. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain spam URLs and subdomains to be programmatically determined and blocked without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

Turning now to FIG. 1A, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; sensors 103*a* and 107; and network 110. It should be understood that operating environment 100 shown in FIG. 1A is an example of one suitable operating environment. Each of the components shown in FIG. 1A is implemented via any type of computing device, such as computing device 500 illustrated in FIG. 6, for example. In one embodiment, these components communicate with each other via network 110, which includes, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing environment 500 in FIG. 5. For instance, server 106 is provided via multiple devices arranged in a distributed environment that collectively provides the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In one embodiment, the server 106 includes certain components of diagrams 200, 300, 400, 500, and 600 of FIGS. 2, 3, 4, 5, and 6, respectively.

In some embodiments, user devices 102a and 102b through 102n comprise any type of computing device capable of use by a user. For example, in one embodiment, user devices 102a and 102b through 102n are the type of computing device 600 described in relation to FIG. 6. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104a and 104b through 104n comprise data sources and/or data systems, which are configured to make data available to any of the various constituents of operating environment 100 or diagrams 200, 300, 400, 500, and 600 of FIGS. 2, 3, 4, 5, and 6, respectively. For instance, in one embodiment, one or more data sources 104a through 104n provide (or make available for accessing), to storage 225 of FIG. 2, search engine 230 of FIG. 2, search engine communication component 240 of FIG. 2, user behavior data-accessing component 250 of FIG. 2, trusted-untrusted domain determination component 260, spam subdomain determination component 270, and each of the corresponding subcomponents, in order to decrease the number of spam URLs that are fetched, stored, and analyzed by determining whether a domain is trusted based on a change in the number of host domains and user behavior, determining the probability that a subdomain prefix of a subdomain of an untrusted domain is randomly generated, and blocking URLs associated with the subdomain from being fetched for analysis when the subdomain prefix is above a threshold probability of having been randomly generated. Certain data sources 104a and 104b through 104n are discrete from user devices 102a and 102b through 102n and server 106 or are incorporated and/or integrated into at least one of those components. In one embodiment, one or more of data sources 104a and 104b through 104n comprise one or more sensors 107, which are integrated into or are associated with one or more of the user device(s) 102a and 102b through 102n or server 106.

Figure 2:
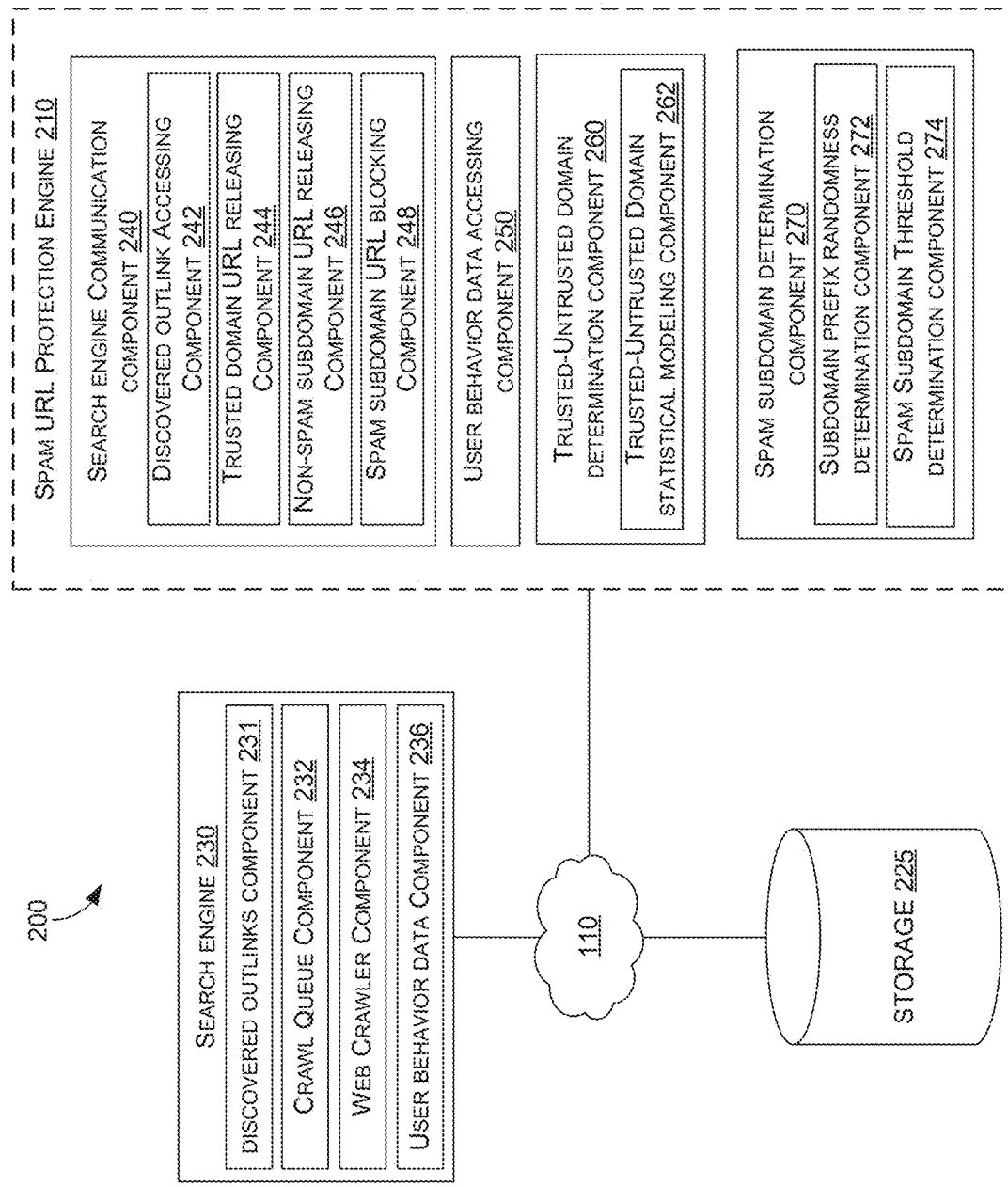
FIG. 2 depicts a block diagram of an example computing device suitable for implementations of the present disclosure.
Figure 4:
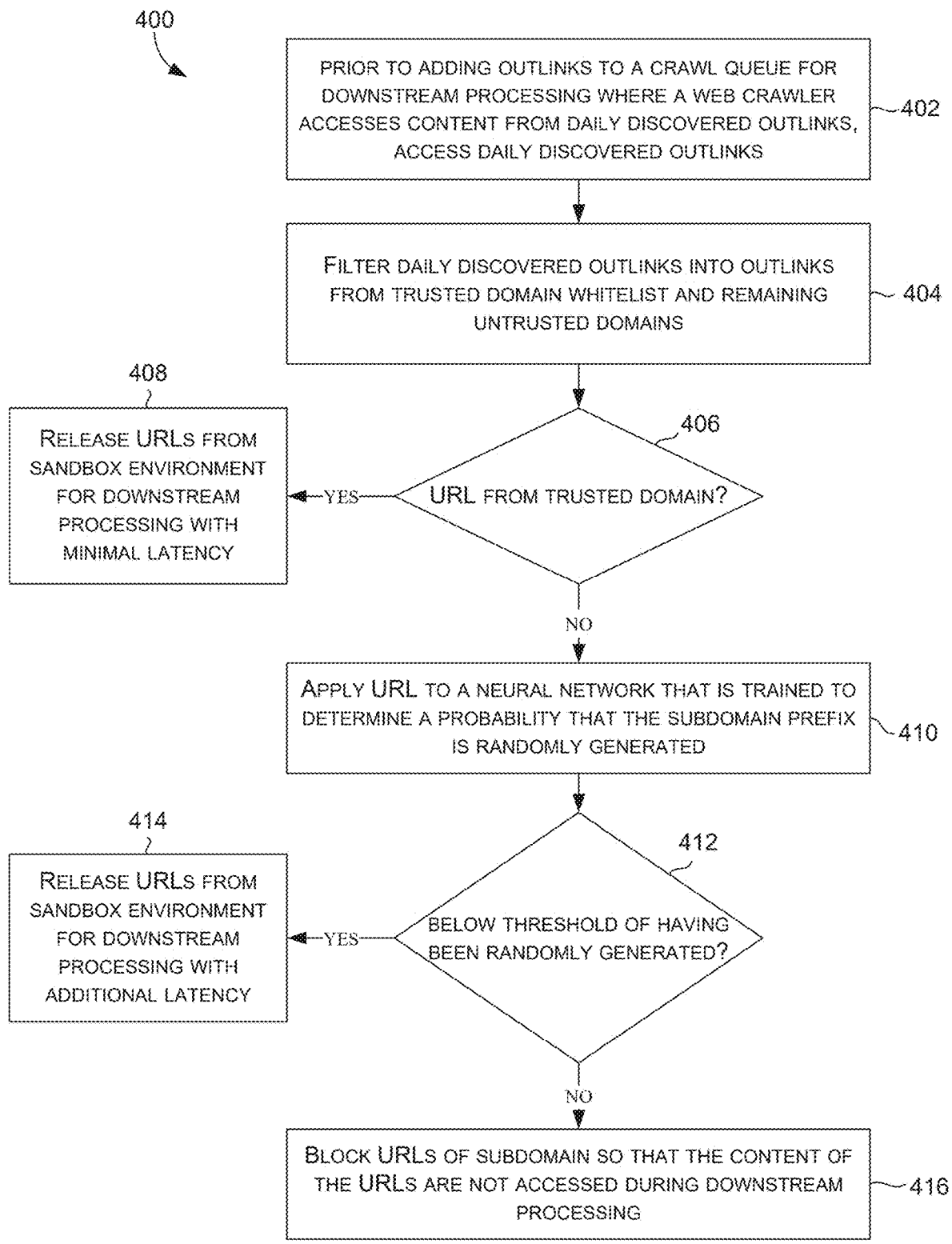
FIG. 4 depicts a flow diagram of a method for decreasing the number of spam URLs that are fetched and analyzed by blocking URLs associated with a subdomain of an untrusted domain when the subdomain prefix is above a threshold probability of having been randomly generated, in accordance with an embodiment of the present disclosure.
Figure 5:
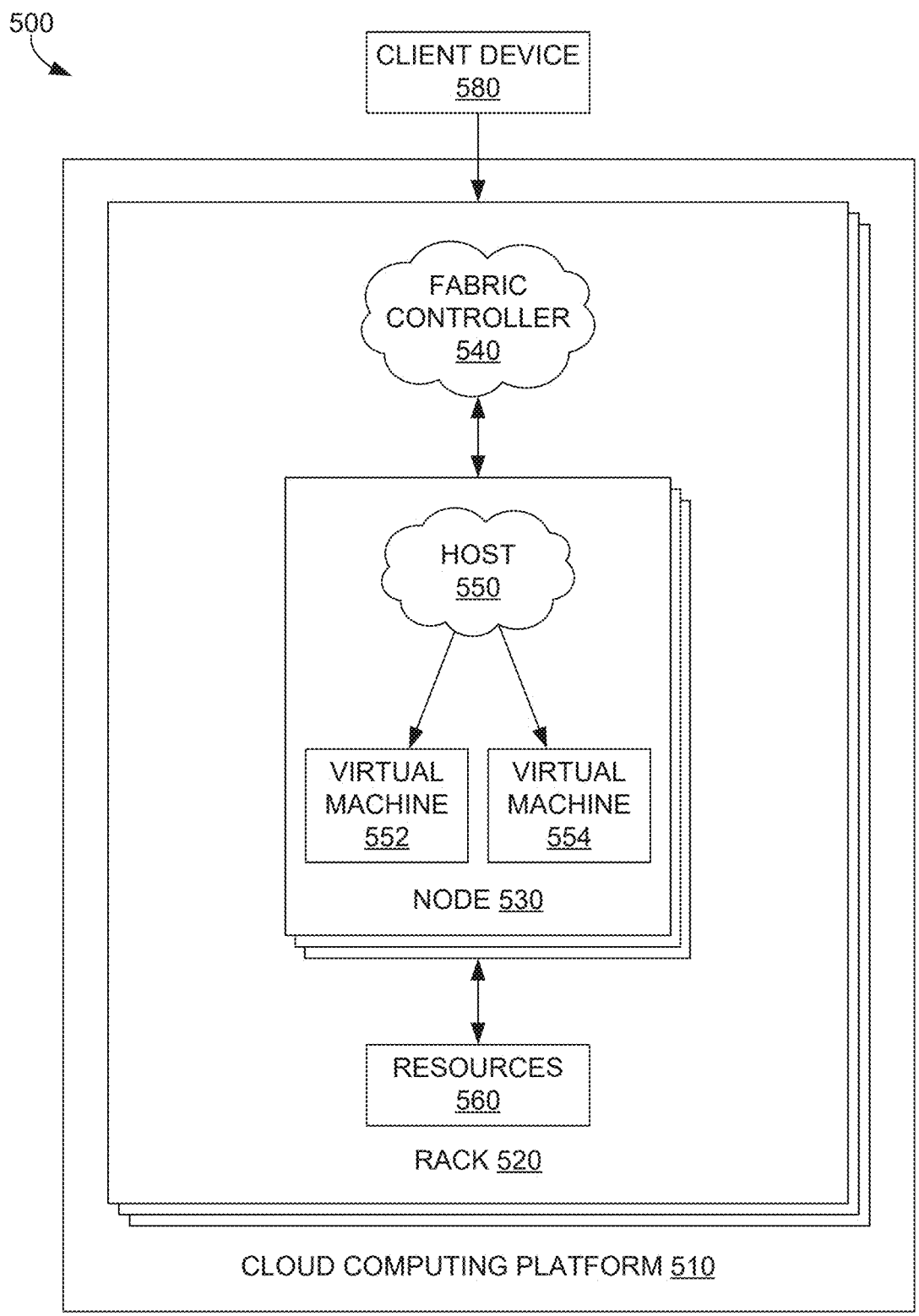
FIG. 5 is a block diagram of an example computing environment suitable for use in implementing an embodiment of the present disclosure.
Figure 6:
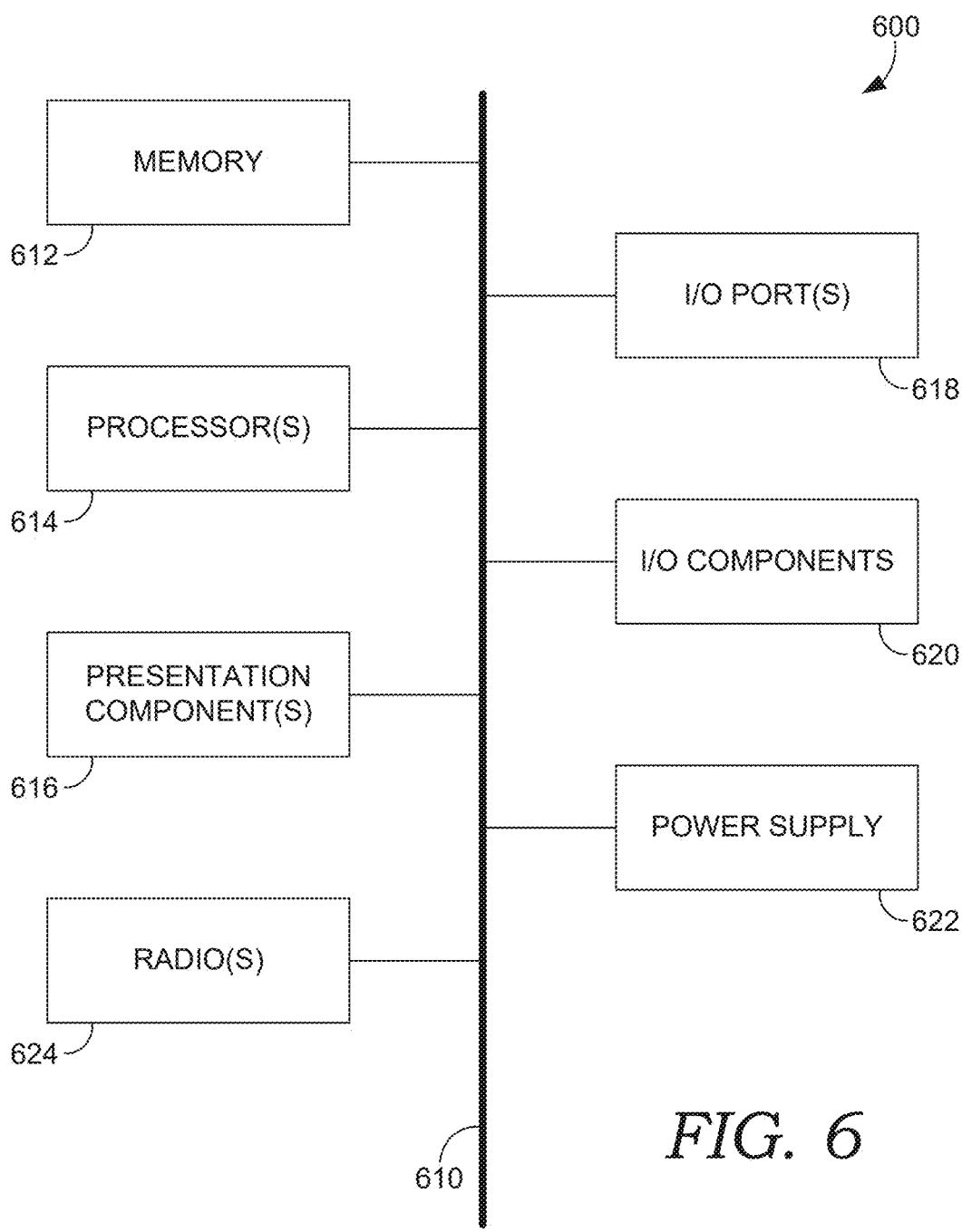
FIG. 6 is a block diagram of an example computing device suitable for use in implementing an embodiment of the present disclosure.

Operating environment 100 can be utilized to implement one or more of the components of diagrams 200, 500, and 600 of FIGS. 2, 5, and 6, respectively, to perform any suitable operations. Operating environment 100 can also be utilized for implementing aspects of methods 400 and 500 in FIGS. 4 and 5, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200, including storage 225, search engine 230 (including its subcomponents, discovered outlinks component 231, crawl queue component 232, web crawler component 234, and user behavior data component 236 [among other components of search engine 230 not shown]), and spam URL protection engine 210, including its subcomponents, search engine communication component 240 (including its subcomponents, discovered outlinks-accessing component 242, trusted domain URL-releasing component 244, non-spam subdomain URL-releasing component 246, and spam subdomain URL-blocking component 248), user behavior data-accessing component 250, trusted-untrusted domain determination component 260 (including its subcomponent, trusted-untrusted domain statistical modeling component 262) and spam subdomain determination component 270 (including its subcomponents, subdomain prefix randomness determination component 272 and spam subdomain threshold determination component 274), may be embodied as a set of compiled computer instructions or functions, program modules, computer software services, or an arrangement of processes carried out on one or more computer systems, such as computing device 600, described in connection to FIG. 6, for example.

In one embodiment, the functions performed by components of system 200 are associated with one or more computer applications, services, or routines, such as a search engine, etc. The functions may operate to decrease the number of spam URLs that are fetched, stored, and analyzed by determining whether a domain is trusted based on a change in the number of host domains and user behavior, determining the probability that a subdomain prefix of a subdomain of an untrusted domain is randomly generated, and blocking URLs associated with the subdomain from being fetched for analysis when the subdomain prefix is above a threshold probability of having been randomly generated. In particular, such applications, services, or routines may operate on one or more user devices (such as user device 102a) or servers (such as server 106). Moreover, in some embodiments, these components of system 200 may be distributed across a network, including one or more servers (such as server 106) and/or client devices (such as user device 102a) in the cloud, such as described in connection with FIG. 5, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Additionally, although functionality is described herein with regard to specific components shown in example system 200, it is contemplated that in some embodiments, functionality of these components can be shared or distributed across other components.

Search engine 230 discovers and indexes content through web crawling and indexing by web crawler component 234. Any known technique for web crawling can be used by web crawler component 234. During indexing, the fetched content stored in storage 225 is analyzed to determine whether to index the webpage, referred to herein as index selection, and to extract relevant information such as keywords, metadata, and other contextual data, and stores the information in an index stored in storage 225. Any known technique analyzing content can be used by web crawler component 234, such as a machine learning model that is trained to determine whether content from a URL is spam to remove the URL from the index.

In order to maintain accurate and up-to-date search results, the index is regularly updated by search engine 230 by re-crawling and re-indexing webpages to reflect the latest content. In this regard, a periodically determined crawl queue can be determined by crawl queue component 232 and stored in storage 225 for use by web crawler component 234 for crawling and indexing. Any known technique can be used by crawl queue component 232 to determine the crawl queue for use by a web crawler for crawling and indexing.

Further, search engine 230 stores user behavior data in storage 225 via user behavior data component 236. User behavior data generally refers to data regarding interactions of users with respect to webpages, such as through search results. User behavior data can include click data indicating the number of times users select a URL from search results, navigation data indicating the number of times user select a URL and the time the users spend navigating on the URL, impressions indicating the number of times a URL is displayed to a user through search results, and/or other interaction data with URLs, such as user data provided by a host domain, owner, and/or third party service for a URL. Any known technique can be used to determine the user behavior data for the URLs of the domains by user behavior data component 236.

In certain embodiments, outlinks discovered during web crawling operations by web crawler component 234 are added to discovered outlinks component 231 and stored in storage 225. The outlinks of discovered outlinks component 231 can be processed to add the processed outlinks, such as seeds determined from the outlinks, to a crawl queue of crawl queue component 232 for use by the web crawler component 234 for crawling and indexing.

In certain embodiments, trusted-untrusted domain determination component 260 determines a trusted domain whitelist and a compromised domain blacklist and stores the trusted domain whitelist and the compromised domain blacklist in storage 225. In certain embodiments, periodically (for example, daily) discovered sets of URLs of discovered outlinks component 231 corresponding to outlinks discovered during periodic (for example, daily) crawl operations by web crawler component 234 are applied to a statistical model of trusted-untrusted domain statistical modeling component 262 to determine the trusted domain whitelist and the compromised domain blacklist. The extracted outlinks, or URLs corresponding to the extracted outlinks, such as seeds extracted from the outlinks, can be filtered by trusted-untrusted domain determination component 260 using the trusted domain whitelist and the compromised domain blacklist before being added to subsequent daily crawl queues of crawl queue component 232 for the crawl operations by web crawler component 234 on subsequent days. Search engine communication component 240 communicates with discovered outlinks component 231 via discovered outlinks-accessing component to access the periodically discovered sets of URLs.

In certain embodiments, the statistical model of trusted-untrusted domain statistical modeling component 262 determines whether a domain should be added to a trusted domain whitelist or a compromised domain blacklist periodically based on the number of discovered URLs of the domain in the periodically discovered set of URLs, the number of subdomains of the domain in the periodically discovered set of URLs, and user behavior data for the domain. In certain examples, the statistical model of trusted-untrusted domain statistical modeling component 262 determines whether a domain should be added to a trusted domain whitelist or a compromised domain blacklist periodically over a lookback time period, such as daily, weekly, monthly, and/or the like, using the periodically discovered set of URLs over the corresponding lookback time period. For example, all of the daily discovered URLs over the course of the month can be applied to the statistical model of trusted-untrusted domain statistical modeling component 262 to determine whether a domain should be added to a trusted domain whitelist or a compromised domain blacklist.

In certain examples, the compromised domain blacklist determined by trusted-untrusted domain statistical modeling component 262 includes compromised domains where a number of subdomains of the domain in the periodically discovered set of URLs over a lookback time period is above a threshold number of subdomains. In certain examples, the compromised domain blacklist determined by trusted-untrusted domain statistical modeling component 262 includes compromised domains where the number of URLs of the domain in the periodically discovered set of URLs over a lookback time period is above a threshold number of URLs. In certain examples, the compromised domain blacklist includes compromised domains where the user behavior data for the entire domain accessed from user behavior data component 236 of search engine 230 via user behavior data-accessing component 250 is below a threshold level over all of the URLs of the domain for a specific time period. In certain examples, the user behavior data can be determined via user behavior data-accessing component 250 based on a ratio of a number of clicks by users of a search engine through a search engine result page of search engine 230 across all of the URLs of the domain over the specific time period. In certain examples, the specific time period can be longer than the lookback time period, such as a year or longer. In certain examples, the user behavior data can be determined via user behavior data-accessing component 250 based on a ratio of a number of clicks by users of a search engine 230 through a search engine result page where the user remains navigating on the URL over a threshold period of time (for example, to ignore accidental clicks) across all of the URLs of the domain over the specific time period.

In certain examples, the compromised domain blacklist determined by trusted-untrusted domain statistical modeling component 262 includes compromised domains based on any combination of determinations based on the periodically discovered set of URLs over a lookback time period implemented by the statistical model, such as (1) (a) the number of subdomains of the domain in the URLs is above a threshold number of subdomains or (b) the number of URLs of the domain is above a threshold number of URLs; and (2) the user behavior data for the entire domain is below a threshold level over all of the URLs of the domain for a specific time period.

In certain examples, the trusted domain whitelist determined by trusted-untrusted domain statistical modeling component 262 includes a threshold number of trusted domains where the user behavior data for the entire domain is above a threshold level over all of the URLs of the domain for a specific time period. In certain examples, a threshold number of trusted domains, such as 100,000 domains, can be added to the trusted domain whitelist where the domains include above a threshold number of URLs with user behavior data above a threshold number, such as a larger number of clicks where the user remains navigating on the URL over a threshold period of time than the threshold number of clicks used to determine the blacklist domains.

In certain examples, the remaining domains where the statistical model of trusted-untrusted domain statistical modeling component 262 does not determine that the corresponding domain should be added to a trusted domain whitelist or a compromised domain blacklist are determined to be untrusted domains.

In certain embodiments, subsequent periodically discovered sets of URLs of discovered outlinks component 231 corresponding to outlinks discovered during periodic crawl operations by web crawler component 234 and/or subsequent user behavior data from user behavior data component 236 can be applied to the statistical model of trusted-untrusted domain statistical modeling component 262 to periodically update the blacklist set of compromised domains and/or the whitelist set of trusted domains in storage 225.

In certain embodiments, prior to adding a periodically (for example, daily) discovered set of URLs of discovered outlinks component 231 corresponding to outlinks discovered during previous crawl operations to a crawl queue of crawl queue component 232 for downstream processing by web crawler 234 to fetch content at each URL, the discovered set of URLs of discovered outlinks component 231 are filtered into URLs from trusted domains of the trusted domain whitelist and untrusted domains. For example, the trusted domain whitelist and the compromised domain blacklist are updated by the statistical model of trusted-untrusted domain statistical modeling component 262 based on the previous discovered sets of outlinks of discovered outlinks component 231. The current daily discovered set of outlinks is then filtered into URLs from domains of the trusted domain whitelist and untrusted domains. The current daily discovered set of outlinks is then used by the statistical model of discovered outlinks component 231 to update the trusted domain whitelist and the compromised domain blacklist at a later point in time after the filtering of the current daily discovered set of outlinks.

In certain embodiments, the URLs of the discovered set of URLs from domains of the trusted domain whitelist are added to the crawl queue of crawl queue of crawl queue component 232 by trusted domain URL-releasing component 244 for crawling and indexing by web crawler component 234 with minimal latency. For example, during downstream processing by the web crawler component 234, the web crawler component 234 fetches the content of the URL and analyzes the content to determine whether the URL is spam using any known technique, such as through machine learning models that analyze the content trained to determine whether content is spam. The URLs of the discovered set of URLs from untrusted domains, such as domains of the compromised domain blacklist and/or untrusted domains not on the trusted domain whitelist, are placed in a sandbox environment by trusted-untrusted domain determination component 260 to isolate and filter out spam URLs before downstream processing by the web crawler component 234 with minor additional latency. In certain examples, all of the URLs of the daily discovered set of URLs of discovered outlinks component 231, including the URLs from trusted domains and the URLs from untrusted domains, are applied to the statistical model of trusted-untrusted domain statistical modeling component 262 to update the trusted domain whitelist and compromised domain blacklist in storage 225 for the filtering of subsequent discovered sets of URLs of discovered outlinks component 231.

In the sandbox environment, the subdomain prefix of the subdomain of each URL from untrusted domains is used by spam subdomain determination component 270 to filter the URLs from untrusted domains into URLs from spam subdomains and URLs from non-spam domains. The URLs from spam subdomains can be blocked by spam subdomain URL-blocking component 248 so that the content from the URL is not fetched and analyzed in downstream processes. The URLs from the non-spam subdomains can be released from the sandbox environment by non-spam subdomain URL-releasing component 246 and added to the crawl queue of crawl queue component 232 for downstream use by web crawler component 234.

In certain embodiments, the subdomain prefix of each of the URLs from untrusted domains are applied to a neural network of subdomain prefix randomness determination component 272 to determine the probability that each subdomain prefix is randomly generated. In certain examples, when a subdomain prefix is above a threshold probability of having been randomly generated, the subdomain is determined by subdomain prefix randomness determination component 272 to be a spam subdomain, and the URLs associated with the spam subdomain can be blocked by spam subdomain URL blocking component 248 so that the content from the URL is not fetched and analyzed in downstream processes of the search engine 230. Any known technique can be used to determine the probability that the subdomain prefix is randomly generated by subdomain prefix randomness determination component 272, such as a CNN.

In certain examples, when a subdomain prefix is below a threshold probability of having been randomly generated, the subdomain is determined by subdomain prefix randomness determination component 272 to be a non-spam subdomain, and the URLs from the non-spam subdomain are released from the sandbox environment by non-spam subdomain URL-releasing component 246 and added to the crawl queue of crawl queue component 232 for downstream use by web crawler component 234 for crawling and indexing. For example, during downstream processing by the web crawler component 234, the web crawler component 234 fetches the content of the URL and analyzes the content to determine whether the URL is spam using any known technique. In this regard, the URLs from non-spam subdomains of untrusted domains (for example, domains of the compromised domain blacklist and/or untrusted domains not on the trusted domain whitelist) can proceed to downstream processing by the web crawler component 234 with minor additional latency (for example, the content can be processed the next day) that ensures the subdomain is less likely to be spam generated from a spam burst attack on a compromised domain.

In certain embodiments, the threshold probability as to whether a subdomain prefix is randomly generated can be determined by spam subdomain threshold determination component 274 based on user behavior data for the URL, subdomain, and/or domain. For instance, as a specific example, a spam subdomain with low user behavior data (for example, a few accidental clicks) and a high probability that the subdomain prefix is randomly generated can be determined to be spam and blocked without requiring the higher computational costs of the downstream processes. In some examples, after aggregating user behavior data from user behavior data component 236 per URL to the subdomain level, spam subdomain threshold determination component 274 can determine that a subdomain with above a threshold level of user behavior can skip the subdomain prefix randomness prediction, as the subdomain is likely to be a non-spam subdomain based on the user behavior data alone. In some examples, after aggregating user behavior per URL to the subdomain level, spam subdomain threshold determination component 274 can determine that a subdomain with less sparse user behavior can have a higher threshold probability as to whether its subdomain prefix is randomly generated to determine whether a subdomain is spam versus a subdomain with more sparse user behavior.

In certain embodiments, a CNN of subdomain prefix randomness determination component 272 can be trained to determine the probability that a subdomain prefix is randomly generated, such as by using a 4-gram pre-trained English tokenizer with a shallow CNN. In certain examples, in order to train the neural network of subdomain prefix randomness determination component 272, training cases are collected, such as training cases corresponding to spam subdomains with random subdomain prefixes (for example, without any user behavior) and non-spam subdomains with non-randomly generated subdomain prefixes. For example, the training cases can be manually curated from known spam and non-spam subdomains. A portion of the training cases are used as training data, and a portion of the training cases are used as evaluation data. In some examples, the training data is fed through a tokenizer and a CNN training module of subdomain prefix randomness determination component 272 in order to train the CNN model with a sigmoid function to predict the probability that a subdomain prefix is randomly generated (for example, as a value in the range of 0.0:1.0). The evaluation data is applied to the trained model of subdomain prefix randomness determination component 272 to determine evaluation metrics, such as precision and recall, of the trained model.

In certain embodiments, the blocked URLs and/or blocked spam subdomains (for example, so that the content from the URL is not fetched and analyzed in downstream processes by the web crawler component 234) can be stored in storage 225 and used by search engine 230 in certain downstream processes of web crawling and indexing by web crawler component 234 and/or determining subsequent crawl queues by crawl queue component 232 and/or discovered outlinks component 231. In certain examples, the blocked URLs are dropped and not stored in storage 225. In certain examples, the blocked URLs and/or spam subdomains can be used by search engine 230 to determine which web pages to include in the index during index selection. For instance, webpages that include a threshold number of links to spam subdomains can be removed from the index. In certain examples, the blocked URLs and/or spam subdomains can be used by search engine 230 to rank web pages. For instance, webpages that include links to spam subdomains can be ranked lower. In certain examples, the blocked URLs and/or spam subdomains can be used by search engine 230 to block URLs from being included in a subsequent crawl queue of crawl queue component 232 and/or discovered outlinks of discovered outlinks component 231, such as by blocking the URLS from being included as discovery seeds, blocking web crawler component 234 from extracting the URLs as outlinks, blocking users from manually adding the blocked URLs for crawling by the web crawler, blocking indications of new content at the URL from RSS feeds, and/or others.

Figure 3:
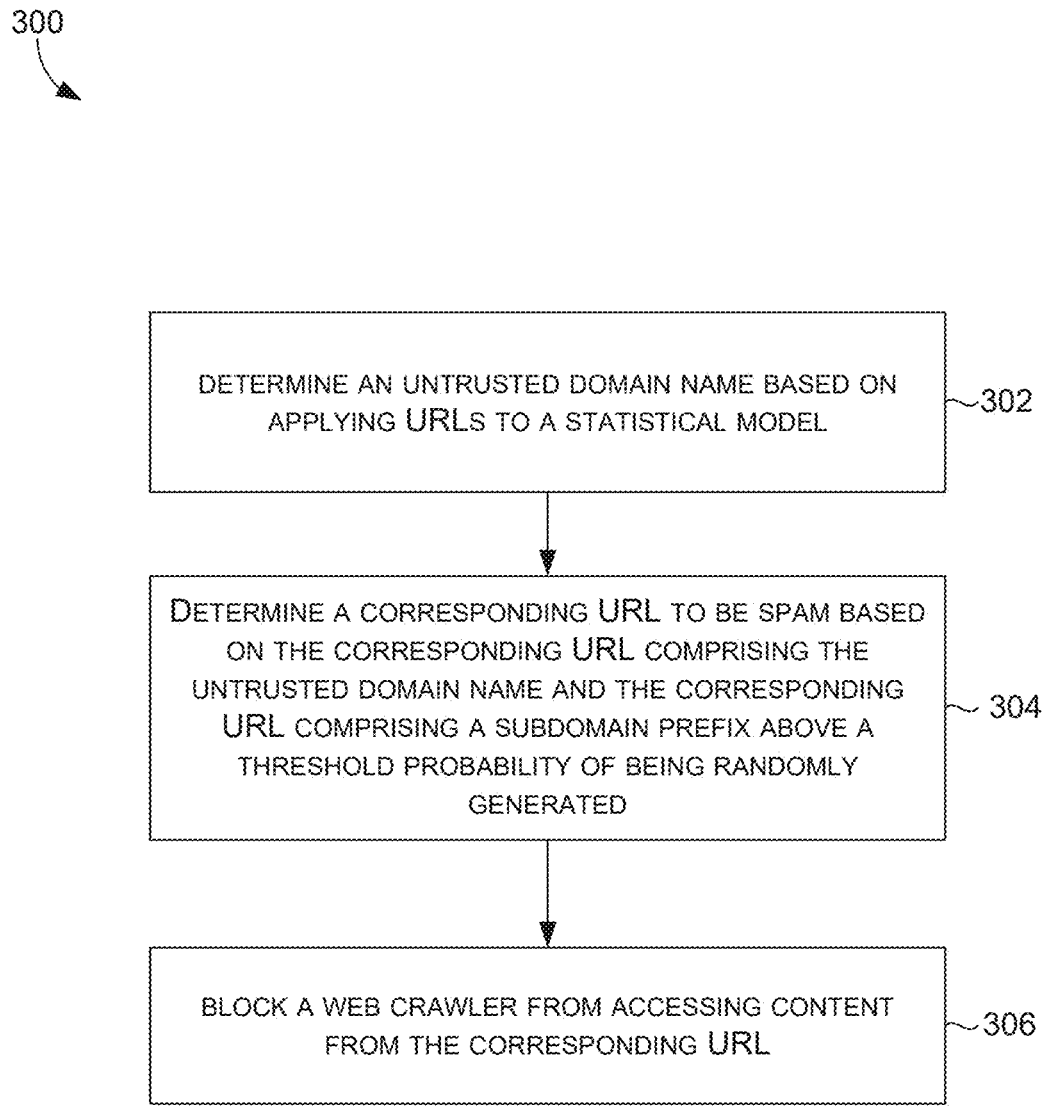
FIG. 3 depicts a flow diagram of a method for decreasing the number of spam URLs that are fetched and analyzed by blocking URLs associated with a subdomain of an untrusted domain when the subdomain prefix is above a threshold probability of having been randomly generated, in accordance with an embodiment of the present disclosure.

Turning now to FIGS. 3 and 4, aspects of example process flows 300 and 400 are illustratively depicted for some embodiments of the disclosure. Embodiments of process flows 300 and 400 each comprise a method (sometimes referred to herein as methods 300 and 400) carried out to implement various example embodiments described herein. For instance, at least one of process flows 300 and 400 is performed to programmatically decrease the number of spam URLs that are fetched and analyzed by blocking URLs associated with a subdomain of an untrusted domain when the subdomain prefix is above a threshold probability of having been randomly generated, which is used to provide any of the improved electronic technology or enhanced technical advantages, as described herein.

Each block or step of process flow 300, process flow 400, and other methods described herein comprises a computing process performed using any combination of hardware, firmware, and/or software. For instance, various functions are carried out by a processor or other hardware component executing instructions stored in memory, such as memory 612 as described in FIG. 6. Embodiments of the methods can also be embodied as computer-usable instructions stored on computer storage media. Embodiments of the methods are provided by a standalone application, a service or hosted service (standalone or in combination with another hosted service), or a plug-in to another product, to name a few. For example, the blocks of process flows 300 and 400 that correspond to actions (or steps) to be performed (as opposed to information to be processed or acted on) are carried out by one or more computer applications or services, in some embodiments, which operate on one or more user devices, and/or are distributed across multiple user devices, and/or servers, or by a distributed computing platform, and/or are implemented in the cloud, such as is described in connection with FIG. 5 and FIG. 6. In some embodiments, the functions performed by the blocks or steps of process flows 300 and 400 are carried out by components illustrated in FIGS. 1 and/or 2, for example.

With reference to FIG. 3, aspects of example process flow 300 are illustratively provided and provide a method for decreasing the number of spam URLs that are fetched and analyzed by blocking URLs associated with a subdomain of an untrusted domain when the subdomain prefix is above a threshold probability of having been randomly generated, in accordance with an embodiment of the present disclosure.

As illustrated, at block 302, example process flow 300 includes determining an untrusted domain name based on applying uniform resource locators (URLs) to a statistical model. In some embodiments, the URLs correspond to a periodically discovered set of URLs corresponding to outlinks from crawling operations by a web crawler. In some embodiments, a blacklist set of compromised domains and a whitelist set of trusted domains are determined based on at least one of a number of URLs above a threshold value and a number of subdomains of a corresponding domain above a different threshold value. In some embodiments, a blacklist set of compromised domains are determined based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain. In some embodiments, the blacklist set of compromised domains and the whitelist set of trusted domains are periodically updated (for example, daily, weekly, monthly, and/or the like) based on applying subsequent periodically (for example, daily) discovered sets of URLs. In some embodiments, the untrusted domain corresponds to a compromised domain of the compromised domain blacklist. In some embodiments, the untrusted domain corresponds to untrusted domains not on the trusted domain whitelist and not on the compromised domain blacklist.

At block 304, example process flow 300 includes determining a corresponding URL to be spam based on the corresponding URL comprising the untrusted domain name and the corresponding URL comprising a subdomain prefix above a threshold probability of being randomly generated. In some embodiments, a CNN is trained to determine a probability that the subdomain prefix is randomly generated, and the probability of the subdomain prefix as output by the CNN is compared to the threshold probability to determine whether the subdomain prefix should be blocked or whether the content of the subdomain should be processed downstream. In some embodiments, the threshold probability of being randomly generated is determined based on user behavior data for the corresponding URL comprising at least one of a number of clicks of the corresponding URL, a number of clicks of a subdomain of the corresponding URL, and a number of clicks of the untrusted domain of the corresponding URL. In some embodiments, the threshold probability of being randomly generated is determined based on user behavior data for a subdomain of the corresponding URL comprising at least one of a number of clicks of the subdomain of the corresponding URL and a ratio of clicks per URL of the subdomain.

At block 306, example process flow 300 includes blocking a web crawler from accessing content from the corresponding URL. In some embodiments, the web crawler is provided access to corresponding content of a different corresponding URL based on the different corresponding URL comprising the untrusted domain name and the different corresponding URL comprising a corresponding subdomain prefix below the threshold probability of being randomly generated. In some embodiments, the web crawler is provided access to corresponding content of a different corresponding URL based on the different corresponding URL comprising a trusted domain name from a trusted domain whitelist. In some embodiments, the web crawler applies a machine learning algorithm to determine whether the corresponding content of the different corresponding URL is spam content.

With reference to FIG. 4, aspects of example process flow 400 are illustratively provided and provide a method for decreasing the number of spam URLs that are fetched and analyzed by blocking URLs associated with a subdomain of an untrusted domain when the subdomain prefix is above a threshold probability of having been randomly generated, in accordance with an embodiment of the present disclosure.

As illustrated, at block 402, example process flow 400 includes accessing daily discovered outlinks that are discovered through crawling operations of a web crawler prior to adding the daily discovered outlinks to a crawl queue for downstream processing where a web crawler accesses content from URLs to analyze content of the URLs, such as by using machine learning algorithms that analyze content of URLs to determine whether the URL is spam. At block 404, example process flow 400 includes filtering the daily discovered outlinks into outlinks from trusted domains on a trusted domain whitelist and untrusted domains, including compromised domains on the compromised domain blacklist and/or untrusted domains not on the whitelist or blacklist. At block 406, example process flow 400 includes determining whether a URL is from a trusted domain on the trusted domain whitelist based on the domain name in the URL. If the URL is from a trusted domain on the trusted domain whitelist, at block 408 example process flow 400 includes that the URL proceeds to downstream processing with minimal latency (for example, the same day).

If the URL is from an untrusted domain on the trusted domain whitelist, such as a compromised blacklist domain or an untrusted domain that is not on the whitelist or blacklist, at block 410 example process flow 400 includes applying a URL (for example, the subdomain prefix of the URL) to a neural network that is trained to determine a probability that the subdomain prefix is randomly generated. At block 412, example process flow 400 includes determining whether the probability of the subdomain prefix having been randomly generated is above a threshold probability. If the subdomain prefix of the subdomain is below a threshold probability of having been randomly generated, at block 414 example process flow 400 includes that the URLs of the subdomain are released from the sandbox environment for downstream processing with additional latency (for example, the next day). If the subdomain prefix of the subdomain is above a threshold probability of having been randomly generated, at block 416 example process flow 400 includes blocking URLs of the subdomain so that the content of the URLs is not accessed during downstream processing where a web crawler accesses content from URLs to analyze content of the URLs, such as by using machine learning algorithms that analyze content of URLs to determine whether the URL is spam.

Other Embodiments

In some embodiments, a computerized system for preserving computing and network resources for search engine crawling and indexing is provided, such as the computerized system described in any of the embodiments above. The computerized system comprises at least one processor and computer memory storing computer-readable instructions, that, when executed by the at least one processor, cause the at least one processor to perform operations. The operations include determining, based on applying uniform resource locators (URLs) to a statistical model, an untrusted domain name. The operations include determining, based on a corresponding URL comprising the untrusted domain name and the corresponding URL comprising a subdomain prefix above a threshold probability of being randomly generated, the corresponding URL to be spam. The operations include causing blocking of a web crawler from accessing content from the corresponding URL. Advantageously, these and other embodiments, as described herein, improve existing computing technologies by providing one or more technical solutions that have technical effects in light of various technical problems. Particular embodiments have the technical effect of decreasing computing and network resource utilization and improving computational efficiency in performing computationally expensive operations, such as those associated with fetching, storing, and analyzing content of spam URLs to determine whether the spam URL is indeed spam. For example, particular embodiments described herein decrease the number of spam URLs that are fetched, stored, and analyzed by determining whether a domain is trusted based on a change in the number of host domains and user behavior, determining the probability that a subdomain prefix of a subdomain of an untrusted domain is randomly generated, and blocking URLs associated with the subdomain from being fetched for analysis when the subdomain prefix is above a threshold probability of having been randomly generated. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain spam URLs and subdomains to be programmatically determined and blocked without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the system, determining the untrusted domain name further includes determining a blacklist set of compromised domains and a whitelist set of trusted domains based on at least one of a number of URLs with respect to a threshold value and a number of subdomains of a corresponding domain with respect to a different threshold value.

In any combination of the above embodiments of the system, determining the untrusted domain name further includes determining a blacklist set of compromised domains based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain.

In any combination of the above embodiments of the system, determining the untrusted domain name further includes determining a blacklist set of compromised domains and a whitelist set of trusted domains based on at least one of a number of URLs with respect to a threshold value and a number of subdomains of a corresponding domain with respect to a different threshold value, and periodically updating the blacklist set of compromised domains and the whitelist set of trusted domains based on applying subsequent URLs to the statistical model.

In any combination of the above embodiments of the system, determining the corresponding URL to be spam further includes training a convolutional neural network (CNN) to determine a probability that the subdomain prefix is randomly generated, and determining that the subdomain prefix is above the threshold probability of being randomly generated based on applying the subdomain prefix to the CNN.

In any combination of the above embodiments of the system, determining the corresponding URL to be spam further includes determining the threshold probability of being randomly generated based on user behavior data for the corresponding URL comprising at least one of a number of clicks of the corresponding URL, a number of clicks of a subdomain of the corresponding URL, and a number of clicks of the compromised domain of the corresponding URL.

In any combination of the above embodiments of the system, determining the corresponding URL to be spam further includes determining the threshold probability of being randomly generated based on user behavior data for a subdomain of the corresponding URL comprising at least one of a number of clicks of the subdomain of the corresponding URL and a ratio of clicks per URL of the subdomain.

In any combination of the above embodiments of the system, the operations include causing the web crawler to access corresponding content of a different corresponding URL based on the different corresponding URL comprising the untrusted domain name and the different corresponding URL comprising a corresponding subdomain prefix below the threshold probability of being randomly generated, and causing applying of a machine learning algorithm to determine whether the corresponding content of the different corresponding URL is spam content.

In any combination of the above embodiments of the system, the operations include causing the web crawler to access corresponding content of a different corresponding URL based on the different corresponding URL comprising a trusted domain name from a trusted domain whitelist, and causing applying of a machine learning algorithm to determine whether the corresponding content of the different corresponding URL is spam content.

In any combination of the above embodiments of the system, the URLs correspond to a periodically discovered set of URLs corresponding to outlinks from crawling operations by a web crawler and causing blocking of the web crawler from accessing content from the corresponding URL is prior to adding the periodically discovered set of URLs to a crawl queue of the web crawler for the web crawler to access content from the crawl queue to update an index.

Various embodiments are directed to one or more computer storage media having computer-executable instructions embodied thereon that, when executed by a computing system having at least one processor and at least one memory, cause the at least one processor to perform operations. The operations include determining, based on applying uniform resource locators (URLs) to a statistical model, an untrusted domain name. The operations include determining, based on a corresponding subdomain comprising the untrusted domain name and the corresponding subdomain comprising a subdomain prefix that is above a threshold probability of being randomly generated, the corresponding subdomain to be spam. The operations include causing blocking of a web crawler from accessing content from the corresponding subdomain. Advantageously, these and other embodiments, as described herein, improve existing computing technologies by providing one or more technical solutions that have technical effects in light of various technical problems. Particular embodiments have the technical effect of decreasing computing and network resource utilization and improving computational efficiency in performing computationally expensive operations, such as those associated with fetching, storing, and analyzing content of spam URLs to determine whether the spam URL is indeed spam. For example, particular embodiments described herein decrease the number of spam URLs that are fetched, stored, and analyzed by determining whether a domain is trusted based on a change in the number of host domains and user behavior, determining the probability that a subdomain prefix of a subdomain of an untrusted domain is randomly generated, and blocking URLs associated with the subdomain from being fetched for analysis when the subdomain prefix is above a threshold probability of having been randomly generated. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain spam URLs and subdomains to be programmatically determined and blocked without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the one or more computer storage media, determining the untrusted domain name further includes determining a blacklist set of compromised domains and a whitelist set of trusted domains based on at least one of a number of URLs with respect to a threshold value and a number of subdomains of a corresponding domain with respect to a different threshold value.

In any combination of the above embodiments of the one or more computer storage media, determining the untrusted domain name further includes determining a blacklist set of compromised domains based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain.

In any combination of the above embodiments of the one or more computer storage media, determining the untrusted domain name further includes determining a blacklist set of compromised domains and a whitelist set of trusted domains based on at least one of a number of URLs with respect to a threshold value and a number of subdomains of a corresponding domain with respect to a different threshold value, and periodically updating the blacklist set of compromised domains and the whitelist set of trusted domains based on applying subsequent URLs to the statistical model.

In any combination of the above embodiments of the one or more computer storage media, determining the corresponding subdomain to be spam further includes training a convolutional neural network (CNN) to determine a probability that the subdomain prefix is randomly generated, and determining that the subdomain prefix is above the threshold probability of being randomly generated based on applying the subdomain prefix to the CNN.

In any combination of the above embodiments of the one or more computer storage media, determining the corresponding subdomain to be spam further includes determining the threshold probability of being randomly generated based on user behavior data for the corresponding subdomain comprising at least one of a number of clicks of the corresponding subdomain, a number of clicks of the compromised domain, a ratio of clicks per URL of the corresponding subdomain, and a ratio of clicks per subdomain of the compromised domain.

In any combination of the above embodiments of the one or more computer storage media, the operations include causing the web crawler to access corresponding content of a different corresponding subdomain based on the different corresponding subdomain comprising the untrusted domain name and the different corresponding subdomain comprising a corresponding subdomain prefix below the threshold probability of being randomly generated, and causing applying of a machine learning algorithm to determine whether the corresponding content of the different corresponding subdomain is spam content.

Various embodiments are directed to computer-implemented methods for preserving computing and network resources for search engine crawling and indexing comprising prior to a web crawler accessing content from uniform resource locators (URLs), including: determining, based on applying the URLs to a statistical model, an untrusted domain name; determining, based on a corresponding URL comprising the untrusted domain name and the corresponding URL comprising a subdomain prefix that is above a threshold probability of being randomly generated, the corresponding URL to be spam; and causing blocking of a web crawler from accessing content from the corresponding URL. Advantageously, these and other embodiments, as described herein, improve existing computing technologies by providing one or more technical solutions that have technical effects in light of various technical problems. Particular embodiments have the technical effect of decreasing computing and network resource utilization and improving computational efficiency in performing computationally expensive operations, such as those associated with fetching, storing, and analyzing content of spam URLs to determine whether the spam URL is indeed spam. For example, particular embodiments described herein decrease the number of spam URLs that are fetched, stored, and analyzed by determining whether a domain is trusted based on a change in the number of host domains and user behavior, determining the probability that a subdomain prefix of a subdomain of an untrusted domain is randomly generated, and blocking URLs associated with the subdomain from being fetched for analysis when the subdomain prefix is above a threshold probability of having been randomly generated. Further, embodiments of this disclosure address a need that arises from a very large scale of operations created by software-based services that cannot be managed by humans. The actions/operations described herein are not a mere use of a computer, but address results of a system that is a direct consequence of software used as a service offered in conjunction with search engines through services hosted across a variety of platforms and devices. Further still, embodiments of this disclosure enable an improved user experience across a number of computer devices, applications, and platforms. Further still, embodiments described herein enable certain spam URLs and subdomains to be programmatically determined and blocked without requiring computer tools and resources for a user to manually perform operations to produce this outcome. In this way, some embodiments, as described herein, reduce or eliminate a need for certain databases, data storage, and computer controls for enabling manually performed steps by an administrator, or the user themselves, to search, identify, assess, and configure (e.g., by hard-coding) specific, static data, thereby reducing the consumption of computing resources.

In any combination of the above embodiments of the computer-implemented method, determining the untrusted domain name further includes determining a blacklist set of compromised domains and a whitelist set of trusted domains based on at least one of a number of URLs with respect to a threshold value and a number of subdomains of a corresponding domain with respect to a different threshold value.

In any combination of the above embodiments of the computer-implemented method, determining that the untrusted domain name further includes determining a blacklist set of compromised domains based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain.

In any combination of the above embodiments of the computer-implemented method, determining the corresponding URL to be spam further includes determining the threshold probability of being randomly generated based on user behavior data for the corresponding URL comprising at least one of a number of clicks of the corresponding URL, a number of clicks of a subdomain of the corresponding URL, and a number of clicks of the compromised domain of the corresponding URL.

Example Computing Environments

Having described various implementations, several example computing environments suitable for implementing embodiments of the disclosure are now described, including an example computing device and an example distributed computing environment in FIGS. 9 and 10, respectively. With reference to FIG. 6, an example computing device is provided and referred to generally as computing device 600. The computing device 600 is but one example of a suitable computing environment and is not intended to suggest any limitation as to the scope of use or functionality of embodiments of the disclosure, and nor should the computing device 600 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet personal computer (PC), or other mobile device, server, or client device. Generally, program modules, including routines, programs, objects, components, data structures, and the like, refer to code that performs particular tasks or implements particular abstract datatypes. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media, including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low-level functions related to, for example, logic, control, and memory operations. Low-level software written in machine code can provide more complex functionality to higher level software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated within the embodiments of the present disclosure.

Referring now to FIG. 5, an example distributed computing environment 500 is illustratively provided, in which implementations of the present disclosure can be employed. In particular, FIG. 5 shows a high-level architecture of an example cloud computing platform 510 that can host a technical solution environment or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 500 that includes cloud computing platform 510, rack 520, and node 530 (for example, computing devices, processing units, or blades) in rack 520. The technical solution environment can be implemented with cloud computing platform 510, which runs cloud services across different data centers and geographic regions. Cloud computing platform 510 can implement the fabric controller 540 component for provisioning and managing resource allocation, deployment, upgrade, and management of cloud services. Typically, cloud computing platform 510 acts to store data or run service applications in a distributed manner. Cloud computing platform 510 in a data center can be configured to host and support operation of endpoints of a particular service application. In one example, the cloud computing platform 510 is a public cloud, a private cloud, or a dedicated cloud.

Node 530 can be provisioned with host 550 (for example, operating system or runtime environment) running a defined software stack on node 530. In one example, a "node" refers to a physical computer system with a distinct host internet protocol (IP) address that is running one or more application servers. Node 530 can also be configured to perform specialized functionality (for example, computer nodes or storage nodes) within cloud computing platform 510. Node 530 is allocated to run one or more portions of a service application of a tenant. A tenant can refer to a customer utilizing resources of cloud computing platform 510. Service application components of cloud computing platform 510 that support a particular tenant can be referred to as a multitenant infrastructure or tenancy. The terms "service application," "application," or "service" are used interchangeably with regards to FIG. 5, and broadly refer to any software, or portions of software, that run on top of, or access storage and computing device locations within, a datacenter.

When more than one separate service application is being supported by nodes 530, certain nodes 530 are partitioned into virtual machines (for example, virtual machine 552 and virtual machine 554). Physical machines can also concurrently run separate service applications. The virtual machines or physical machines can be configured as individualized computing environments that are supported by resources 560 (for example, hardware resources and software resources) in cloud computing platform 510. It is contemplated that resources can be configured for specific service applications. Further, each service application may be divided into functional portions such that each functional portion is able to run on a separate virtual machine. In cloud computing platform 510, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 580 is linked to a service application in cloud computing platform 510. Client device 580 may be any type of computing device, and the client device 580 can be configured to issue commands to cloud computing platform 510. In embodiments, client device 580 communicates with service applications through a virtual Internet Protocol (IP) and load balancer or other means that direct communication requests to designated endpoints in cloud computing platform 510. Certain components of cloud computing platform 510 communicate with each other over a network (not shown), which includes, without limitation, one or more local area networks (LANs) and/or wide area networks (WANs).

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. In one example, bus 610 represents one or more buses (such as an address bus, data bus, or combination thereof). Although the various blocks of FIG. 6 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 6 is merely illustrative of an example computing device that can be used in connection with one or more embodiments of the present disclosure. Distinction is not made between such categories as "workstation," "server," "laptop," or "handheld device," as all are contemplated within the scope of FIG. 6 and with reference to "computing device."

Computing device 600 typically includes a variety of computer-readable media. Computer-readable media can be any available media that can be accessed by computing device 600 and includes both volatile and non-volatile, removable and non-removable media. By way of example, and not limitation, computer-readable media comprises computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 612 includes computer storage media in the form of volatile and/or non-volatile memory. In one example, the memory is removable, non-removable, or a combination thereof. Hardware devices include, for example, solid-state memory, hard drives, and optical-disc drives. Computing device 600 includes one or more processors 614 that read data from various entities such as memory 612 or I/O components 620. As used herein and in one example, the term "processor," "processing unit," or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, a cloud computing system, or parallel processing by more than a single processor. Further, various operations described herein as being executed or performed by a processor are performed by more than one processor.

Presentation component(s) 616 presents data indications to a user or other device. Presentation components include, for example, a display device, speaker, printing component, vibrating component, and the like.

The I/O ports 618 allow computing device 600 to be logically coupled to other devices, including I/O components 620, some of which are built-in. Illustrative components include a microphone, joystick, game pad, satellite dish, scanner, printer, or a wireless device. The I/O components 620 can provide a natural user interface (NUI) that processes air gestures, voice, or other physiological inputs generated by a user. In some instances, inputs are transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. In one example, the computing device 600 is equipped with depth cameras, such as stereoscopic camera systems, infrared camera systems, red-green-blue (RGB) camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 include one or more radio(s) 624 (or similar wireless communication components). The radio transmits and receives radio or wireless communications. Example computing device 600 is a wireless terminal adapted to receive communications and media over various wireless networks. Computing device 600 may communicate via wireless protocols, such as code-division multiple access ("CDMA"), Global System for Mobile ("GSM") communication, or time-division multiple access ("TDMA"), as well as others, to communicate with other devices. In one embodiment, the radio communication is a short-range connection, a long-range connection, or a combination of both a short-range and a long-range wireless telecommunications connection. When referring to "short" and "long" types of connections, certain embodiments do not refer to the spatial relation between two devices. Instead, certain embodiments generally refer to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a wireless local area network (WLAN) connection using the 802.11 protocol; a Bluetooth connection to another computing device is a second example of a short-range connection, or a near-field communication connection. A long-range connection may include a connection using, by way of example and not limitation, one or more of code-division multiple access (CDMA), General Packet Radio Service (GPRS), Global System for Mobile Communication (GSM), time-division multiple access (TDMA), and 802.16 protocols.

Example computing devices 600 comprise any type of computing device capable of use by a user, such as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an Music Player 3 (MP3) player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both; (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers ℕ). The objects included in other sets may be continuous objects (for example, the set of real numbers ℝ). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

In one example, a "workload" (also referred to herein in one example as "tasks," "jobs," or "workflow") refers to a series or collection of activities or computations associated with completing a task. In one example, a "workload" is also referred to as a "job," a "task," a "set of jobs," or a "set of tasks." An example AI-based workload includes aspects of raw data processing, featurization, training, inference, and deployment. In some embodiments, the workload from user accounts is classified based on the job type and the deployment type. In one example, the job type refers to the task classification and includes any suitable classification such as "basic," "standard," and/or "premium," as defined by a service-level agreement (SLA).

In one example, an "accelerator," "processor," or "coprocessor" can be used interchangeably to refer to a piece of hardware utilized in a data center and used to run a virtual machine and/or execute a workload that includes certain tasks, such as AI-based tasks, for example, associated with an LLM. In one example, the term "coprocessor" or "accelerator" excludes central processing units (CPUs) and includes components that work in conjunction with the CPUs, such as a graphics processing unit (GPU), a field-programmable gate array (FPGA), an application-specific integrated circuit (ASIC), a Single Input, Multiple Data (SIMD) processor, or a tensor processing unit ("TPU"), among other suitable processing hardware devices.

As used herein, the terms "application" or "app" may be employed interchangeably to refer to any software-based program, package, or product that is executable via one or more (physical or virtual) computing machines or devices. An application may be any set of software products that, when executed, provide an end user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present disclosure are described with reference to a computing device or a distributed computing environment; however, the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract datatypes using code. Further, while embodiments of the present disclosure may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system for preserving computing and network resources for search engine crawling and indexing, comprising:
   at least one processor; and
   computer memory storing computer-useable instructions that, when executed by the at least one processor, cause the at least one processor to perform operations comprising:
   determining, based on applying uniform resource locators (URLs) to a statistical model that models changes to numbers of URLs and subdomains per domain and user behavior per domain, an untrusted domain name prior to downstream processing by a web crawler to access content from the URLs;
   determining, based on a corresponding URL comprising the untrusted domain name and the corresponding URL comprising a subdomain prefix above a threshold probability of being randomly generated, the corresponding URL to be spam by:
      filtering, based on the corresponding URL comprising the untrusted domain, the corresponding URL into a sandbox environment isolated from the downstream processing; and
      applying, in the sandbox environment, the corresponding URL to a neural network trained to determine a probability that the subdomain prefix of the corresponding URL is randomly generated; and
   causing blocking of the corresponding URL from the downstream processing and releasing other URLs from the sandbox environment for the downstream processing.

2. The computerized system of claim 1, wherein determining the untrusted domain name further comprises:
   determining a blacklist set of compromised domains and a whitelist set of trusted domains based on at least one of a number of URLs with respect to a threshold value and a number of subdomains of a corresponding domain with respect to a different threshold value; and
   wherein the untrusted domain name corresponds to one of the compromised domains of the blacklist set of compromised domains.

3. The computerized system of claim 1, wherein determining the untrusted domain name further comprises:
   determining a blacklist set of compromised domains based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain; and wherein the untrusted domain name corresponds to one of the compromised domains of the blacklist set of compromised domains.

4. The computerized system of claim 1, wherein determining the untrusted domain name further comprises:

determining a blacklist set of compromised domains and a whitelist set of trusted domains based on at least one of a number of URLs with respect to a threshold value and a number of subdomains of a corresponding domain with respect to a different threshold value;

wherein the untrusted domain name corresponds to one of the compromised domains of the blacklist set of compromised domains; and periodically updating the blacklist set of compromised domains and the whitelist set of trusted domains based on applying subsequent URLs to the statistical model.

5. The computerized system of claim 1, wherein the neural network is a convolutional neural network (CNN) and the operations further comprising:

training the CNN to determine a probability that the subdomain prefix is randomly generated by training a 4-gram tokenizer using training data comprising spam subdomains with random subdomain prefixes and non-spam subdomains with non-randomly generated subdomain prefixes.

6. The computerized system of claim 1, wherein determining the corresponding URL to be spam further comprises:

determining the threshold probability of being randomly generated based on user behavior data for the corresponding URL comprising at least one of a number of clicks of the corresponding URL, a subdomain of the corresponding URL, and the untrusted domain name of the corresponding URL.

7. The computerized system of claim 1, wherein determining the corresponding URL to be spam further comprises:

determining the threshold probability of being randomly generated based on user behavior data for a subdomain of the corresponding URL comprising at least one of a number of clicks of the subdomain of the corresponding URL and a ratio of clicks per URL of the subdomain.

8. The computerized system of claim 1, the operations further comprising:

causing the web crawler to access corresponding content of a different corresponding URL based on the different corresponding URL comprising the untrusted domain name and the different corresponding URL comprising a corresponding subdomain prefix below the threshold probability of being randomly generated; and after releasing the different corresponding URL from the sandbox environment, causing applying of a machine learning algorithm to determine whether the corresponding content of the different corresponding URL is spam content.

9. The computerized system of claim 1, the operations further comprising:

causing the web crawler to access corresponding content of a different corresponding URL based on the different corresponding URL comprising a trusted domain name from a trusted domain whitelist; and causing applying of a machine learning algorithm to determine whether the corresponding content of the different corresponding URL is spam content.

10. The computerized system of claim 1, wherein the URLs correspond to a periodically discovered set of URLs corresponding to outlinks from crawling operations by the web crawler and wherein causing blocking of the web crawler from accessing content from the corresponding URL is prior to adding the periodically discovered set of URLs to a crawl queue of the web crawler for the downstream processing by the web crawler to access content from the crawl queue to update an index.

11. One or more non-transitory computer storage media having computer-executable instructions embodied thereon that, when executed by a computing system having at least one processor and at least one memory, cause the at least one processor to perform operations comprising:

determining, based on applying uniform resource locators (URLs) to a statistical model that models changes to numbers of URLs and subdomains per domain and user behavior per domain, an untrusted domain name prior to downstream processing by a web crawler to access content from the URLs;

determining, based on a corresponding subdomain comprising the untrusted domain name and the corresponding subdomain comprising a subdomain prefix above a threshold probability of being randomly generated, the corresponding subdomain to be spam by:

filtering, based on the corresponding subdomain comprising the untrusted domain, the corresponding subdomain into a sandbox environment isolated from the downstream processing; and applying, in the sandbox environment, the corresponding subdomain to a neural network trained to determine a probability that the subdomain prefix of the corresponding subdomain is randomly generated; and causing blocking of the corresponding subdomain from the downstream processing and releasing other subdomains from the sandbox environment for the downstream processing.

12. The one or more non-transitory computer storage media of claim 11, wherein determining the untrusted domain name further comprises:

determining a blacklist set of compromised domains and a whitelist set of trusted domains based on at least one of a number of URLs with respect to a threshold value and a number of subdomains of a corresponding domain with respect to a different threshold value; and wherein the untrusted domain name corresponds to one of the compromised domains of the blacklist set of compromised domains.

13. The one or more non-transitory computer storage media of claim 11, wherein determining the untrusted domain name further comprises:

determining a blacklist set of compromised domains based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain; and wherein the untrusted domain name corresponds to one of the compromised domains of the blacklist set of compromised domains.

14. The one or more non-transitory computer storage media of claim 11, wherein determining the untrusted domain name further comprises:
- determining a blacklist set of compromised domains and a whitelist set of trusted domains based on at least one of a number of URLs with respect to a threshold value and a number of subdomains of a corresponding domain with respect to a different threshold value;
- wherein the untrusted domain name corresponds to one of the compromised domains of the blacklist set of compromised domains; and
- periodically updating the blacklist set of compromised domains and the whitelist set of trusted domains based on applying subsequent URLs to the statistical model.

15. The one or more non-transitory computer storage media of claim 11, wherein the neural network is a convolutional neural network (CNN) and the operations further comprising:
- training the CNN to determine a probability that the subdomain prefix is randomly generated by training a 4-gram tokenizer using training data comprising spam subdomains with random subdomain prefixes and non-spam subdomains with non-randomly generated subdomain prefixes.

16. The one or more non-transitory computer storage media of claim 11, wherein determining the corresponding subdomain to be spam further comprises:
- determining the threshold probability of being randomly generated based on user behavior data for the corresponding subdomain comprising at least one of a number of clicks of the corresponding subdomain, a corresponding number of clicks of the untrusted domain name, a ratio of clicks per URL of the corresponding subdomain, and a corresponding ratio of clicks per subdomain of the compromised domain.

17. The one or more non-transitory computer storage media of claim 11, the operations further comprising:
- causing the web crawler to access corresponding content of a different corresponding subdomain based on the different corresponding subdomain comprising the untrusted domain name and the different corresponding subdomain comprising a corresponding subdomain prefix below the threshold probability of being randomly generated; and
- after releasing the different corresponding subdomain from the sandbox environment, causing applying of a machine learning algorithm to determine whether the corresponding content of the different corresponding subdomain is spam content.

18. A computer-implemented method for preserving computing and network resources for search engine crawling and indexing, comprising:
- prior to downstream processing by a web crawler accessing content from uniform resource locators (URLs):
  - determining, based on applying the URLs to a statistical model that models changes to numbers of URLs and subdomains per domain from crawl queue discovery operations and user behavior per domain, an untrusted domain name;
  - determining, based on a corresponding URL comprising the untrusted domain name and the corresponding URL comprising a subdomain prefix above a threshold probability of being randomly generated, the corresponding URL to be spam by:
    - filtering, based on the corresponding URL comprising the untrusted domain, the corresponding URL into a sandbox environment isolated from the downstream processing; and
    - applying, in the sandbox environment, the corresponding URL to a neural network trained to determine a probability that the subdomain prefix of the corresponding URL is randomly generated; and
  - causing blocking of the corresponding URL from the downstream processing and releasing other URLs from the sandbox environment for the downstream processing.

19. The computer-implemented method of claim 18, wherein determining the untrusted domain name further comprises:
- determining a blacklist set of compromised domains and a whitelist set of trusted domains based on at least one of a number of URLs with respect to a threshold value and a number of subdomains of a corresponding domain with respect to a different threshold value; and
- wherein the untrusted domain name corresponds to one of the compromised domains of the blacklist set of compromised domains.

20. The computer-implemented method of claim 18, wherein determining the untrusted domain name further comprises:
- determining a blacklist set of compromised domains based on (1) at least one of a number of URLs above a threshold value and a number of subdomains of a corresponding domain above a different threshold value and (2) user behavior data of the corresponding domain below a corresponding threshold value, the user behavior data corresponding to a ratio of a total number of clicks through a search engine result page per URL of the corresponding domain; and
- wherein the untrusted domain name corresponds to one of the compromised domains of the blacklist set of compromised domains.

\* \* \* \* \*